(12) United States Patent
Kopp et al.

(10) Patent No.: US 8,800,378 B2
(45) Date of Patent: Aug. 12, 2014

(54) METHOD AND APPARATUS FOR A PRESSURE MEASURING CELL

(75) Inventors: Thomas Kopp, Wolfach (DE); Jörn Jacob, Kirnbach (DE); Martin Mellert, Steinach (DE); Josef Fehrenbach, Haslach (DE); Thomas Deck, Wolfach (DE)

(73) Assignee: VEGA Grieshaber KG, Wolfach (DE)

( * ) Notice: Subject to any disclaimer, the term of this patent is extended or adjusted under 35 U.S.C. 154(b) by 324 days.

(21) Appl. No.: 13/159,347

(22) Filed: Jun. 13, 2011

(65) Prior Publication Data

US 2012/0137785 A1    Jun. 7, 2012

Related U.S. Application Data

(60) Provisional application No. 61/421,142, filed on Dec. 8, 2010.

(30) Foreign Application Priority Data

Dec. 7, 2010  (EP) .................................... 10015383

(51) Int. Cl.
*G01L 7/00* (2006.01)
*G01L 9/00* (2006.01)

(52) U.S. Cl.
CPC .................................... *G01L 9/0072* (2013.01)
USPC ........................................... 73/753; 73/706

(58) Field of Classification Search
CPC ................................................... G01L 9/0072
USPC ............................................ 73/753, 715, 706
See application file for complete search history.

(56) References Cited

U.S. PATENT DOCUMENTS

| 4,703,658 A | 11/1987 | Mrozack, Jr. et al. |
| 6,374,680 B1 * | 4/2002 | Drewes et al. ................. 73/718 |
| 2005/0103109 A1 * | 5/2005 | Hegner et al. .................. 73/706 |

FOREIGN PATENT DOCUMENTS

EP    0 569 899 A1    11/1993

OTHER PUBLICATIONS

EPC Patent Appln. No. 10 015 383.2—EPC Search Report mailed May 25, 2011, 4 pages (German), 1 page (English—translation).

* cited by examiner

*Primary Examiner* — Lisa Caputo
*Assistant Examiner* — Brandi N Hopkins
(74) *Attorney, Agent, or Firm* — Andrew F. Young, Esq.; Lackenbach Siegel, LLP

(57) ABSTRACT

The invention is for a method and apparatus for a pressure measuring cell for measuring a metered pressure, with a base body having at least one base body electrode and with a membrane body connected to the base body to form a sensor chamber, which has at least one membrane electrode and can be subjected to the pressure of a medium that is below the measurement pressure, wherein both the wall of the sensor chamber that is formed by the base body and the wall of the sensor chamber that is formed by the membrane body is covered with a protective layer; according to the invention, the protective layer is fashioned as a glass layer.

11 Claims, 1 Drawing Sheet

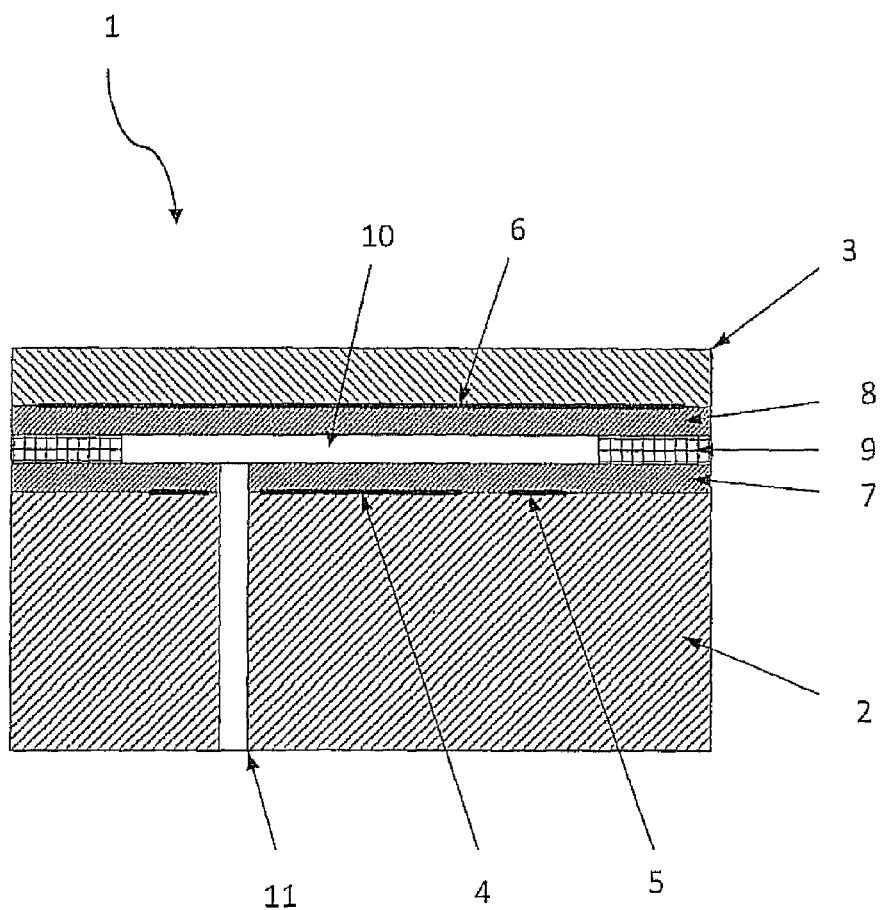

METHOD AND APPARATUS FOR A PRESSURE MEASURING CELL

CROSS REFERENCE TO RELATED APPLICATIONS

This application relates to, and claims priority from, European Patent Application Ser. No. 10 015 383.2, filed Dec. 7, 2010, the entire contents of which is incorporated herein fully by reference.

Further, this application is related to U.S. Provisional Application Ser. No. 61/421,142, filed Dec. 7, 2010, the entire contents of which is incorporated herein fully by reference

FIGURE FOR PUBLICATION

FIG. 1.

BACKGROUND OF THE INVENTION

1. Field of the Invention

The present invention relates to a method and apparatus for a pressure measuring cell. More specifically, the present invention relates to a relative pressure measuring cell for measuring a pressure and having a base body with at least one base body electrode and with a membrane body connected to the base body to form a sensor chamber.

2. Description of the Related Art

The related art involves relative pressure sensors which are used to measure the differential pressure between the pressure in a measurement medium and the current atmospheric pressure. Such a relative pressure sensor is composed of a base body, which together with a measurement membrane joined to the latter at the margin forms a sensor chamber or pressure chamber. For the relative pressure measurement, the reference air is conducted into the sensor chamber through a vent opening in the base body, while the measurement pressure is applied to the surface of the membrane away from the sensor chamber. The deformation of the measurement membrane produced in this way is a measure of the relative pressure, which is converted into a measurement signal.

Ceramic capacitive pressure measuring cells are soldered or brazed together at the margin from a base-body sintered body and a membrane sintered body by means of a spacing holder, so that a sensor chamber is produced. The solder or active resin solder used, such as glass fit, serves as the spacing holder itself.

Before joining the base body and the membrane body, base body electrodes and a membrane electrode are applied to their surfaces that form the walls of the sensor chamber, usually by sputtering of tantalum.

Due to the supplying of the reference air through the vent opening, moisture gets into the sensor chamber, and when it drops below its dew point it may condense there and impair the function. Buildup of water influences the dielectric constant of the active electrode surfaces, resulting in an offset of the zero point of the pressure sensor.

In order to improve the tolerance with respect to moisture, it is proposed by EP 1 061 351 A1 to coat the entire inner surfaces of the sensor chamber of such a pressure measuring cell with a hydrophobic material, preferably making use of silanes. Since such coatings of silanes are organic, they have a limited temperature range of use. A further drawback is that such coatings on account of the temperature limitations can only be created after the joining of membrane and base body by means of a vacuum through the vent opening in the base body, i.e., a high manufacturing expense is required for this.

A similar method for further improving the tolerance with respect to humidity is described by DE 101 63 567 A1, in which the sensor chamber is likewise provided with a hydrophobic coating of silanes; but, this coating is created by means of a CVD (chemical vapor deposition) process, being deposited on the walls of the sensor chamber through the vent opening. Since this is likewise a vacuum method, the expense is very large and the result of a uniform layer deposition can only be checked with difficulty. Furthermore, the resulting layers of silane compounds are likewise not resistant to high temperature.

What is not appreciated by the prior art are the costs associated from protecting the sensor chambers of pressure measuring cells from the negative electrical effects from the buildup of water molecules within those chambers.

Accordingly, there is a need for an improved pressure measuring cell of the kind mentioned at the outset with a protective layer inside it, so that the negative electrical effects from buildup of water molecules are largely avoided, is simple to manufacture, and the aforementioned drawbacks in regard to the protective layer are avoided.

ASPECTS AND SUMMARY OF THE INVENTION

The problem in the art is solved by a pressure measuring cell with a protective layer inside it, so that the negative electrical effects from buildup of water molecules are largely avoided, is simple to manufacture, and the aforementioned drawbacks in regard to the protective layer are avoided.

The present invention relates to a pressure measuring cell for measuring a metered pressure, with a base body having at least one base body electrode and with a membrane body connected to the base body to form a sensor chamber, which has at least one membrane electrode and can be subjected to the pressure of a medium that is below the measurement pressure, wherein both the wall of the sensor chamber that is formed by the base body and the wall of the sensor chamber that is formed by the membrane body is covered with a protective layer; according to the invention, the protective layer is fashioned as a glass layer.

Such a pressure measuring cell, especially a relative pressure measuring cell for measuring a measurement pressure, is characterized in that both the wall of the sensor chamber that is formed by the base body and the wall of the sensor chamber that is formed by the membrane body is covered with a protective layer, which is fashioned as a glass layer according to the invention.

The action of water molecules building up on these glass layers is greatly reduced, i.e., they have no major influence on the capacitances of the measuring cell, since the electrodes are fully insulated from each other, and neither can the water accumulations cause by-passes, so that an influencing of the impedances of the overall system of the measurement cell is for the most part ruled out.

Such a glass layer, passivating both the base body and also the membrane body, is resistant to high temperature, yet easy to produce, since its fabrication is done prior to the joining together of the base body with the membrane body into a complete measuring cell. Moreover, such a glass layer according to the invention achieves a good moisture protection and at the same time also a mechanical protection of the electrodes, since especially in an overload situation it prevents the electrodes from rubbing against each other and thereby prevents a loosening of particles from the electrodes.

According to one embodiment of the present invention, it is advantageous to cover with the glass layer the entire surface of the base body on which the at least one base body electrode is formed, and preferably in identical manner also the entire surface of the membrane body on which the membrane electrode is formed.

This substantially simplifies the fabrication process for depositing the glass layer onto the surfaces of the base body and the membrane body that are provided with the electrodes, since no structuring of these surfaces is required for this.

According to another embodiment of the present invention, it is advantageous for the base body and the membrane body to be joined together at the margin by means of a spacing holder produced as glass solder. Joining of the base body and the membrane body by means of the glass solder produces a complete glass encapsulation in the interior of the measurement cell.

According to another embodiment of the present invention, it is especially advantageous to fashion the pressure measuring cell as a relative pressure measuring cell, wherein the sensor chamber has a vent opening by which a reference pressure can be applied to it.

The various embodiments disclosed hereinabove also give rise to the method of the present invention, wherein there is provided a method of measuring a metered pressure involving a pressure measuring cell. The method comprises a series of step that begin with providing a base body having at least one base body electrode and a glass layer. There is then provided a membrane body connected to the base body and to a sensor chamber therewith. The sensor chamber comprises at least one membrane electrode which can be subjected to the pressure of a medium that is below the measurement pressure.

Additional steps include: providing a first wall located within the interior of the sensor chamber; providing a second wall that is formed by the membrane body; and, covering the first wall and the second wall with a protective layer, wherein the protective layer is fashioned as a glass layer.

The method of the present invention further provides for receiving an electronic signal from the at least one membrane electrode upon subjection to the pressure of the medium, thereby enabling an operative measuring of the metered pressure.

In an alternative embodiment, the entire surface of the base body on which the at least one base body electrode is formed is covered with the glass layer.

In a further embodiment, the entire surface of the membrane body, on which the membrane electrode is formed, is covered with the glass layer.

In an alternative embodiment of the present invention, the method further comprises the step of joining together at a margin the base body and the membrane body by means of a spacing holder produced as glass solder.

In an alternative embodiment of the present invention, the method further comprises the step of applying a reference pressure to the sensor chamber via a vent opening wherein the pressure measuring cell is fashioned as a relative pressure measuring cell.

The above, and other aspects, features and advantages of the present invention will become apparent from the following description read in conjunction with the accompanying drawings, in which like reference numerals designate the same elements.

BRIEF DESCRIPTION OF THE DRAWINGS

FIG. 1 shows a schematic cross sectional representation of a sample embodiment of a relative pressure measuring cell according to the present invention.

DETAILED DESCRIPTION OF THE PREFERRED EMBODIMENTS

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

Turning to FIG. 1, the relative pressure measuring cell 1 represented is designed as a ceramic capacitive pressure sensor. One example of the ceramic material that can be utilized is aluminum oxide. The relative pressure measuring cell 1 comprises a base body 2, which is configured as a round circular disk with planar parallel surfaces, and a membrane body 3. The membrane body 3 has a round circular form adapted to the diameter of the base body 2, yet whose thickness is much less than the thickness of the base body 2, since the surface of the membrane body 3 facing away from the base body 2, is subjected to a measurement pressure and, therefore, the membrane body 3 must be deformable.

Directly on the base body 2 are arranged a measuring electrode 4 and a reference electrode 5 as the base body electrodes; accordingly, the surface of the membrane body 3 adjacent to the base body 2 is provided with a membrane electrode 6. The measurement electrode 4 is arranged essentially as a circle in the middle of the surface of the base body 2 and encircled by the annular reference electrode 5, situated at a distance. The membrane electrode 6 covers approximately the entire surface of the membrane body 3, except for a narrow peripheral margin region.

The surfaces of the base body 2 and membrane body 3 that are provided with the electrodes 4 and 5 or 6, respectively, are coated with a thin glass layer 7 or 8. These layers 7 and 8 are deposited on the surfaces prior to a sintering by means of a high-temperature atmospheric process by a customary method, such as dab printing or silk screen printing. This sintering produces dense and very firm glass layers 7 and 8. Conventional glass pastes are used for these layers 7 and 8.

After the base body 2 has been provided with a vent opening 11, the base body and membrane body 2 and 3 prepared in this way with the glass layers 7 and 8 are brazed together to form a sensor chamber 10 with the surfaces having the electrodes 4 and 5, or 6, facing each other, and inserting a glass spacing holder 9 around the margin. The glass solder used for this, such as a glass frit, itself serves as the spacing holder. The connection resulting from this between this spacing holder 9 and the glass layers 7 and 8 results in a complete glass encapsulation of the sensor chamber 10. The vent opening 11 extends from the surface of the base body 2 away from the membrane body 3 into the glass layer 7 and thereby connects the sensor chamber 10 to the outside atmosphere.

Such a pressure measuring cell 1, as described herein, responds much less to moist surroundings and the associated formation of condensate in the interior or in the sensor chamber 10, especially in terms of electrical behavior, as compared to pressure measuring cells of the known prior art.

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. A pressure measuring cell for measuring a metered pressure, said pressure measuring cell comprising:
    (a) a base body, said base body having at least one base body electrode;
    (b) a membrane body connected to said base body to form a sensor chamber, said sensor chamber comprising at least one membrane electrode which is capable of being subjected to a pressure of a medium that is below a measurement pressure;
    (c) a first wall of said sensor chamber, said first wall formed by said base body; and
    (d) a second wall that is formed by said membrane body; and
        (i) wherein at least one of said first wall and said second wall is coated with a protective layer so as to minimize any negative electrical effects from a build-up of water molecules thereon; and
        (ii) wherein said protective layer is fashioned as a glass layer;
    wherein said protective layer covers an entire surface of said base body on which said at least one base body electrode is formed and covers an entire surface of said membrane body on which said at least one membrane electrode is formed; and
    wherein said base body and said membrane body are joined together at a margin by a spacing holder produced as glass solder.

2. The pressure measuring cell according to claim 1, wherein said pressure measuring cell is fashioned as a relative pressure measuring cell, wherein said sensor chamber further comprises a vent opening through which a reference pressure can be applied to said sensor chamber.

3. A pressure measuring cell for measuring a metered pressure, said pressure measuring cell comprising:
    (a) a base body, said base body further comprising:
        (i) at least one base body electrode; and
        (ii) a glass layer, said glass layer covering an entire surface of said base body;
    (b) a membrane body connected to said base body to form a sensor chamber, said sensor chamber comprising at least one membrane electrode which is capable of being subjected to a pressure of a medium that is below a measurement pressure;
    (c) a first wall located within the interior of said sensor chamber, said first wall formed by said base body; and
    (d) a second wall that is formed by said membrane body; and
        (i) wherein at least one of said first wall and said second wall is coated with a protective layer so as to minimize any negative electrical effects from a build-up of water molecules thereon; and
        (ii) wherein said protective layer is fashioned as a glass layer;
    wherein said protective layer covers an entire surface of said membrane body on which said at least one membrane electrode is formed; and
    wherein said base body and said membrane body are joined together at a margin by a spacing holder produced as glass solder.

4. The pressure measuring cell according to claim 3, wherein said base body further comprises a vent opening, wherein said vent opening extends from said surface of said base body away from said membrane body into said glass layer.

5. The pressure measuring cell according to claim 3, wherein said pressure measuring cell is fashioned as a relative pressure measuring cell, wherein said sensor chamber further comprises a vent opening through which a reference pressure can be applied to said sensor chamber.

6. A method of measuring a metered pressure involving a pressure measuring cell, said method comprising the steps of:
    (a) providing a base body, said base body further comprising:
        (i) at least one base body electrode; and
        (ii) a glass layer;
    (b) providing a membrane body connected to said base body, said membrane body and said base body forming a sensor chamber therewith, and said sensor chamber comprising at least one membrane electrode which is capable of being subjected to a pressure of a medium that is below a measurement pressure;
    (c) providing a first wall located within the interior of said sensor chamber, said first wall formed by said base body; and
    (d) providing a second wall that is formed by said membrane body;
    (e) coating at least one of said first wall and said second wall with a protective layer so as to minimize any negative electrical effects from a build-up of water molecules thereon; and
    (f) joining together at a margin said base body and said membrane body by a spacing holder produced as glass solder;
    wherein said protective layer is fashioned as a glass layer; and
    wherein said protective layer covers an entire surface of said base body on which said at least one base body electrode is formed and covers an entire surface of said membrane body on which said at least one membrane electrode is formed.

7. The method of claim 6, said method further comprising the step of:
    receiving an electronic signal from said at least one membrane electrode upon subjection to said pressure of said medium, thereby enabling an operative measuring of a metered pressure.

8. The method of claim 6, said method further comprising the step of:
    applying a reference pressure to said sensor chamber via a vent opening, wherein said pressure measuring cell is fashioned as a relative pressure measuring cell.

9. A method of manufacturing a metered pressure involving a pressure measuring cell, said method comprising the steps of:

(a) providing a base body, said base body further comprising:
  (i) at least one base body electrode; and
  (ii) a glass layer, said glass layer covering an entire surface of said base body;
(b) providing a membrane body connected to said base body, said membrane body and said base body forming a sensor chamber therewith, and said sensor chamber comprising at least one membrane electrode which is capable of being subjected to a pressure of a medium that is below a measurement pressure;
(c) providing a first wall located within the interior of said sensor chamber, said first wall formed by said base body;
(d) providing a second wall that is formed by said membrane body;
(e) coating at least one of said first wall and said second wall with a protective layer so as to minimize any negative electrical effects from a build-up of water molecules thereon; wherein said protective layer is fashioned as a glass layer;
(f) covering said surface of said membrane body on which said membrane electrode is formed with said glass layer; and
(g) joining together at a margin said base body and said membrane body by a spacing holder produced as glass solder.

10. The method of claim 9, said method further comprising the step of:
receiving an electronic signal from said at least one membrane electrode upon subjection to said pressure of said medium, thereby enabling an operative measuring of said metered pressure.

11. The method of claim 9, said method further comprising the step of:
applying a reference pressure to said sensor chamber via a vent opening, wherein said pressure measuring cell is fashioned as a relative pressure measuring cell.

* * * * *